(12) United States Patent
Hyslop et al.

(10) Patent No.: US 11,826,803 B2
(45) Date of Patent: Nov. 28, 2023

(54) ACCELERATED TISSUE DISSOLUTION

(71) Applicants: Richard M. Hyslop, Greeley, CO (US);
Corina E. Brown, Greeley, CO (US);
Edward A. Gazvoda, Denver, CO (US)

(72) Inventors: Richard M. Hyslop, Greeley, CO (US);
Corina E. Brown, Greeley, CO (US);
Edward A. Gazvoda, Denver, CO (US)

(73) Assignee: Fireless Cremation Company, Denver, CO (US)

( * ) Notice: Subject to any disclaimer, the term of this patent is extended or adjusted under 35 U.S.C. 154(b) by 284 days.

(21) Appl. No.: 17/089,547

(22) Filed: Nov. 4, 2020

(65) Prior Publication Data

US 2021/0129197 A1    May 6, 2021

Related U.S. Application Data

(60) Provisional application No. 62/931,050, filed on Nov. 5, 2019.

(51) Int. Cl.
*B09B 3/00*   (2022.01)
*C05F 1/00*   (2006.01)
*C05G 5/23*   (2020.01)

(52) U.S. Cl.
CPC .............. *B09B 3/0075* (2013.01); *C05F 1/00* (2013.01); *C05G 5/23* (2020.02)

(58) Field of Classification Search
None
See application file for complete search history.

(56) References Cited

U.S. PATENT DOCUMENTS

| 7,387,719 | B2 | 6/2008 | Carson et al. |
| 8,931,147 | B2 | 1/2015 | Sullivan |
| 9,233,405 | B2 * | 1/2016 | Wilson .................. B09B 3/0075 |
| 2015/0306643 | A1 | 10/2015 | Ross |

FOREIGN PATENT DOCUMENTS

| CN | 110278939 A | * | 9/2019 | ............... A01N 1/00 |
| WO | WO 2017/140243 A1 | * | 8/2017 | ........... B09B 3/0075 |

OTHER PUBLICATIONS

Chemistry LibreTexts, "7.8 Acids and Bases in Industry and in Daily Life", Aug. 22, 2019, (Aug. 22, 2019), retrieved on Dec. 31, 2020 from https://chem.libretexts.org/Courses/Sacremento_City_College/SCC%3A_CHEM_330_Adventures_in_Chemistry_(Alviar-Agnew)_07%3A_Acids_and_Bases/7.08%3A_Acids_and_Bases_in_Industry_and_in_Daily_Life; entire document, especially p. 1 last paragraph-p. 2, Table 7.8.1.

(Continued)

*Primary Examiner* — Wayne A Langel
(74) *Attorney, Agent, or Firm* — Samuel M. Freund; Cochran Freund & Young LLC

(57) ABSTRACT

Methods for the chemical dissolution of human and other cadavers, such as pets as an example, using ethanolic potassium hydroxide (KOH) or ethanol-water solutions of KOH at atmospheric pressure are described. After acid neutralization, to a neutral pH range, the resulting solutions may be applied to the earth for disposal as fertilizer, or further treated using hydrogen peroxide. Use of ethanol has been found to reduce the dissolution time of the cadavers to approximately two hours for high concentrations of KOH.

25 Claims, 1 Drawing Sheet

(56) References Cited

OTHER PUBLICATIONS

James, "What is Ethanolic Potassium Hydroxide?", Apr. 24, 2017 (Apr. 24, 2017), retrieved on Dec. 31, 2020 from https://sciencing.com/ethanolic-potassium-hydroxide-7483457.html; entire document, especially p. 1 para 1-2.
The International Search Report and Written Opinion of the International Searching Authority, PCT/US2020/58954, dated Feb. 2, 2021, 9 pages.

* cited by examiner

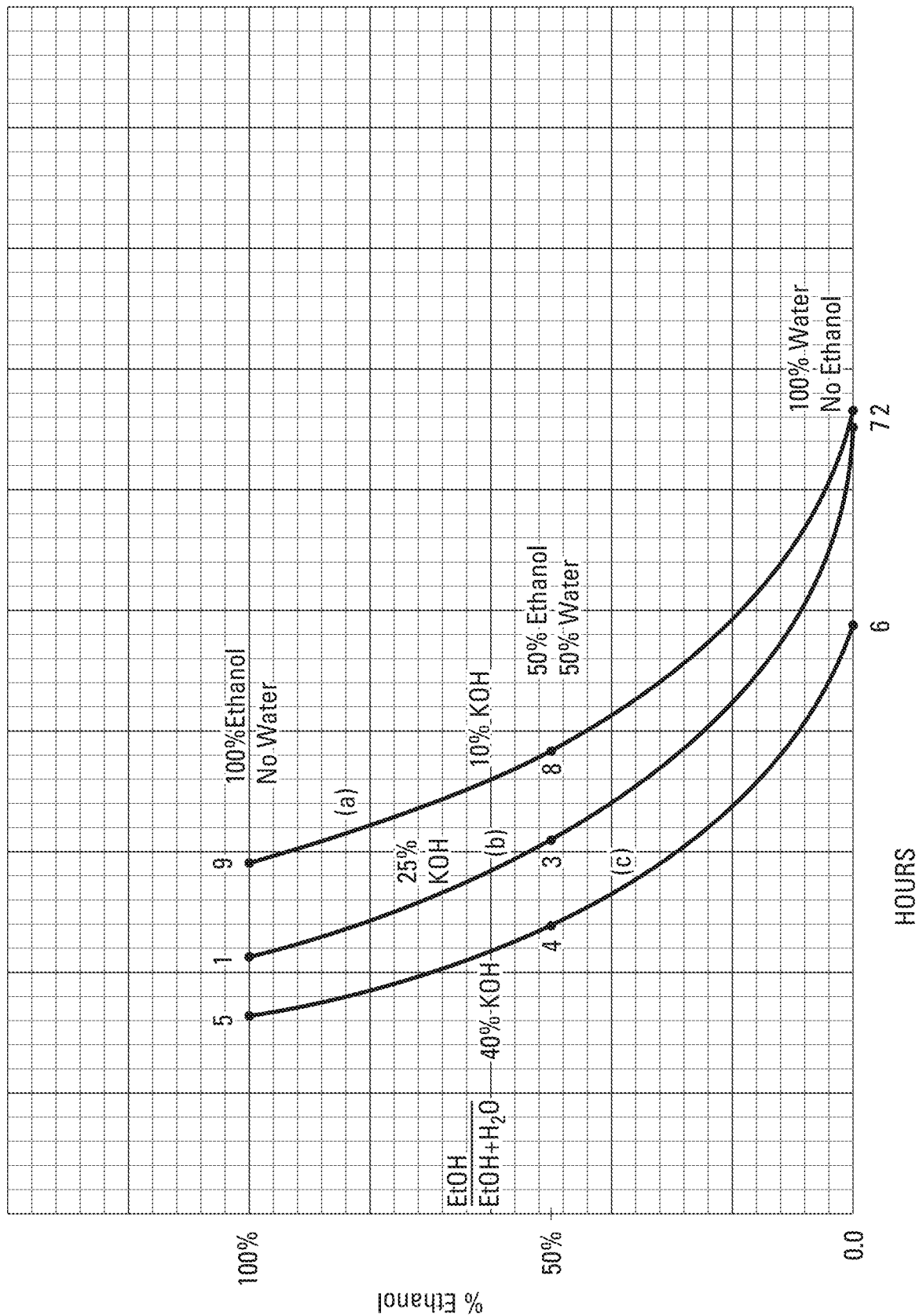

ACCELERATED TISSUE DISSOLUTION

CROSS-REFERENCE TO RELATED APPLICATIONS

The present application claims the benefit of U.S. Provisional Patent Application No. 62/931,050 for "Accelerated Tissue Digestion" by Richard M. Hyslop et al., which was filed on Nov. 5, 2019, the entire content of which application is hereby specifically incorporated by reference herein for all that it discloses and teaches.

BACKGROUND

Increasingly, tissue dissolution has been used as an alternative to incineration for disposal of tissue, proteins, animal carcasses, and human cadavers. Dissolution of tissue using a strong alkali solution, is known as alkaline hydrolysis. The effluent produced is emptied into a sanitary sewer or dried and shipped to a landfill. After the dissolution process, approximately 6% of the original weight of the carcass remains as bones and teeth. The final bones are sterile and easily processed into a form usable as a soil additive or may be placed in an urn at the direction of the family.

SUMMARY

In accordance with the purposes of the present invention, as embodied and broadly described herein, an embodiment of the method for chemical dissolution of tissue from cadavers hereof, includes: preparing an alkali solution having a chosen quantity of potassium hydroxide, or sodium hydroxide, or a mixture of potassium hydroxide and sodium hydroxide, in ethanol, or a mixture of potassium hydroxide, or sodium hydroxide, or a mixture of sodium hydroxide and potassium hydroxide, water and ethanol; contacting the tissue with the alkali solution; heating the tissue and the alkali solution to a desired temperature; determining when the dissolution of the tissue is complete; and reacting the resulting solution with nitric acid, or carbonic acid, or a mixture of nitric acid and carbonic acid, or another acid, to a chosen pH.

Benefits and advantages of the present invention include, but are not limited to, providing a method for chemical dissolution of cadavers using a strong alkali dissolved in ethanol, or dissolved in an ethanol/water mixture, which proceeds in approximately two hours at atmospheric pressure and at a chosen temperature.

BRIEF DESCRIPTION OF THE DRAWING

The accompanying FIGURE, which is incorporated in and forms a part of the specification, illustrates the embodiments of the present invention and, together with the description, serves to explain the principles of the invention.

The FIGURE is a graph of the dissolution time in hours for mice in 10% KOH (curve (a)); 25% KOH (curve (b)); and 40% KOH (curve (c)), for KOH solutions in 100% Ethanol, 50% Ethanol and 50% Water, and for 100% Water.

DETAILED DESCRIPTION

Briefly, embodiments of the present invention provide methods for the chemical dissolution of tissue from human and other cadavers, such as pets as an example, using ethanolic potassium hydroxide (KOH) and ethanol-water solutions of KOH heated to a desired temperature at atmospheric pressure. After neutralization, to a neutral pH range, the resulting solutions may be applied to the earth for disposal. Further, the solution can be treated using an oxidizer such as hydrogen peroxide, as an example, for additional breakdown of lipids, to obviate the need for waste treatment facilities to handle the lipid's biological oxygen demand. The use of an acid, such as nitric acid, to lower the pH of the heated solution to a level suitable for application to the earth results in a crystalline material, which can readily be separated from the solution, once cooled, thereby reducing the biological oxygen demand for waste treatment facilities. It has been found that crystalline material is formed when the nitric acid is added to the warm dissolution solution (between around 100° F. and 165° F.), when the pH of the solution is lowered to greater than about 6, and the resulting solution temperature is between about 80° F. and 100° F.

In what follows, the term "tissue" includes medical waste from humans and animals as well as portions of and entire bodies thereof.

Carbon dioxide as carbonic acid may also be used to lower the pH for disposal in sewers and waste water treatment facilities, as is the current practice for alkaline hydrolysis. See, e.g., U.S. Pat. No. 9,233,405 for "Methods And Apparatuses For Digesting Tissue" by Joseph H. Wilson et al., which issued on Jan. 12, 2016. Use of ethanol has been found to reduce the dissolution time of the cadavers to approximately two hours for high concentrations of KOH, as compared with 18-24 hours for systems using solely water and alkali.

About 40 g of KOH will dissolve in 100 mL of ethanol versus about 121 g of KOH in 100 mL water at room temperature. Potassium hydroxide will also dissolve in other low molecular-weight alcohols such as methanol and propanol, but has lower solubility in isopropanol than in ethanol and methanol. Alcohols can participate in an acid-base equilibrium; in the case of ethanol the potassium ethoxide (ethylate) forms: $KOH+CH_3CH_2OH \rightarrow CH_3CH_2OK+H_2O$. Further, as a nucleophile in organic chemistry, KOH serves as a source of $OH^-$ in both inorganic and organic materials. Aqueous KOH also saponifies esters: $KOH+RCOOR' \rightarrow RCOOK+R'OH$. Amides are another example of saponification when aqueous KOH is used for the hydrolysis reaction.

Alternatively, KOH is used in anhydrous form such as in ethanolic KOH (KOH dissolved in ethanol) when reactions are water sensitive or when performing an elimination-type reaction, such as dehydration.

In embodiments of the present invention, ethanol was initially considered to facilitate more homogenous solutions for more efficient base hydrolysis of the triglyceride esters. Further since alcoholic KOH can react through an elimination type reaction mechanism as opposed to the substitution type mechanism of aqueous KOH, it is anticipated by the inventors that a microenvironment of alcoholic KOH within the tissues of cadavers would lead to additional degradation of the lipids via elimination of hydrogen by the ethoxide.

Methanol, when oxidized, forms formaldehyde and formic acid, both less desirable for disposal than the acetaldehyde and acetic acid formed as oxidation products of ethanol. Acetone, which is highly flammable, can be formed from oxidation of isopropanol.

Bases, such as $Ca(OH)_2$ or $Ba(OH)_2$ have poor water and alcohol solubility. NaOH and mixtures of NaOH and KOH can be used, but the presence of sodium in the dissolution products when using NaOH is not considered to be as good a fertilizer. However, if the neutralized dissolution solution is intended to be disposed of in the ocean, as an example, NaOH alone or mixed with KOH would be a good substitute for KOH. Additionally, salt (containing NaCl) water and/or clean sea water may be used to prepare KOH and NaOH solutions, and solutions containing mixtures of NaOH and KOH, for the dissolution process, if such disposal is anticipated.

Dissolution is considered to be completed when all the tissue is digested, and only bones and/or teeth remain. This may be determined visually, when the bones are observed to be devoid of tissue, or based on reaction time from previous experience with dissolution or digestion of tissue from similar cadavers. Dissolution time depends on the initial body weight, the quantity and concentration of the chemicals employed, and the temperature of the cadaver and chemicals during the dissolution process. Bones can be dissolved by further reaction with KOH.

At the request of the family of the deceased, bones may be separated from the dissolution solution, and provided to the family for burial. Other arrangements, where bones, crystalline material, and/or liquid effluent from the deceased may be returned. After dissolution of the cadaver tissues was completed, the bones were observed to be softer.

Reference will now be made in detail to the present embodiments of the invention, examples of which are illustrated in the accompanying FIGURE. It will be understood that the FIGURE is presented for the purpose of describing particular embodiments of the invention and is not intended to limit the invention thereto. Turning now to the FIGURE, the corrected dissolution times in hours for mice in 10% by weight KOH (curve (a)); 25% by weight KOH (curve (b)); and 40% KOH by weight (curve (c)) for KOH solutions in 100% Ethanol by weight, 50% Ethanol by weight and 50% Water by weight, and for 100% Water by weight, are graphically illustrated.

The TABLE provides the data used in the FIGURE for the dissolution times for mice using KOH. The temperature for all experiments was between 155° F. and 170° F.

TABLE

| Experiment | Time (h) | Mice (g) | KOH (g) | $H_2O$ (g) | EtOH (g) | % KOH | Corrected Time(h) |
|---|---|---|---|---|---|---|---|
| 1 | 2.15 | 26 | 6.25 | 0.00 | 25.0 | 25 | 2.15 |
| 2 | 5.25 | 31.68 | 7.92 | 31.68 | 0.00 | 25 | 6.65 |
| 3 | 2.30 | 33 | 8.25 | 16.50 | 16.50 | 25 | 3.04 |
| 4 | 2.37 | 35.3 | 14.12 | 17.65 | 17.65 | 40 | 2.37 |
| 5 | 1.62 | 35.55 | 14.22 | 0.00 | 35.55 | 40 | 1.63 |
| 6 | 4.57 | 37.61 | 15.04 | 37.61 | 0.00 | 40 | 4.87 |
| 7 | 6.55 | 41.85 | 4.19 | 41.85 | 0.00 | 10 | 6.55 |
| 8 | 3.62 | 44.46 | 4.45 | 22.23 | 22.23 | 10 | 3.85 |
| 9 | 2.68 | 45.85 | 4.59 | 0.00 | 45.85 | 10 | 2.94 |

As may be observed from the FIGURE and the TABLE, the dissolution times for the mice cadavers depend on the concentrations of KOH in the solutions in water, ethanol, and in mixtures of water and ethanol, and on the quantities of ethanol in the KOH solutions. For example, with no ethanol in the KOH/water solution the dissolution time for the 40% by weight KOH solution is 1.37 times faster than that for the 10% by weight KOH solution, whereas the 100% ethanol, 10% by weight KOH solution is 2.23 times faster than the 10% by weight KOH solution with no ethanol present. The entries in the column containing the corrected time in hours has not been adjusted for the different weights of the mice, but has been corrected for the resulting different amounts of KOH used in grams in both the TABLE and the FIGURE. For example, the 2.68 hours for dissolution for Experiment 9 has been multiplied by 4.59/4.19 to yield 2.94 hours.

The shortest measured dissolution time of 1.63 h occurred with a 40% KOH solution in 100% ethanol.

Solutions were prepared having 10%, 25%, and 40% by weight of KOH in 100% $H_2O$, 50% $H_2O$ and 50% ethanol, and 100% ethanol, having solvent weights equal to the weight (in g) of the cadavers (mice). All experiments were performed in glass, wide-mouthed bottles. Slight agitation (shaking or rocking of the bottles or vessels) or stirring was employed. Sonication or sonication combined with rocking of the solution may also be used. The temperature was raised from room temperature to the desired temperature using at least one heating element external to the vessels over a period of about 1 h; however, the temperature can be increased more rapidly, if desired. Temperatures were kept below 200° F. The cadaver may be placed in contact with the fully mixed alkaline solution, or with the desired volume of $H_2O$, followed by addition of the ethanol (or ethanol then $H_2O$) to which the appropriate weight of KOH is added; that is, with the alkaline solution as it is being prepared. The cadavers were not necessarily covered by the solutions. The dissolution processes were open to ambient conditions and, as stated above, reactions were terminated, when visual observation determined that only bones remained in the solution. Covering the bottles containing the heated solutions without actually sealing the glass vessels used was determined to be helpful as evaporation of the alcohol was at least partially prevented.

After dissolution was completed, solutions were dark in color, non-viscous, and had an odor of ammonia. After the tissue has reacted and, either prior to or after neutralization, bones may be collected in a filter basket. Implants may also be collected, as may teeth.

Following dissolution, the solutions were neutralized (pH~7) while warm with 67% $HNO_3$ solution. The pH was measured using a pH meter. Other mineral acids, such as HCl and $H_2SO_4$ were not used since these acids are not good fertilizers, but could be used. Phosphoric acid was found to be very slow in neutralizing the dissolution mixtures. If the solutions will receive further treatment at a waste water facility, carbon dioxide can be used to neutralize the solutions to an acceptable level, typically, a maximum pH of 10.5.

As stated above, neutralization was performed while the solution was still warm. If the solution was neutralized after being cooled, a highly viscous solution having a fatty surface layer resulted. However, if the warm solution is neutralized, and the pH kept above about 6, a watery solution from which crystalline material can be filtered is the product.

Hydrogen peroxide ($H_2O_2$ (30%)) was added to the dissolution solution after the reaction was completed, and the solution neutralized in pH. To bleach cleave long-chain fatty acids, the volume of added $H_2O_2$ was approximately 70-100% of the weight of the cadaver. The resulting solutions may be used directly as soil fertilizer. Hydrogen peroxide may also be added to the dissolution solution before neutralization.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for chemical dissolution of cadavers, comprising:
   preparing an ethanolic potassium hydroxide solution having greater than or equal to 10% by weight of potassium hydroxide in ethanol or in a mixture of potassium hydroxide, water, and ethanol;
   contacting the cadaver with the ethanolic potassium hydroxide solution;
   heating the cadaver and the ethanolic potassium hydroxide solution to a temperature above 155° F. and below 200° F. at atmospheric pressure; and
   determining when the dissolution of said cadaver is completed, whereby a dissolution solution having a pH is formed.

2. The method of claim 1, further comprising the step of reacting the dissolution solution with nitric acid to form a solution having lower pH than the pH of the dissolution solution.

3. The method of claim 2, wherein the pH of the dissolution solution is between about 5 and about 11.

4. The method of claim 3, further comprising the step of contacting the pH-lowered solution with hydrogen peroxide.

5. The method of claim 3, further comprising the step of bringing the pH of the dissolution solution to about 7, and applying the resulting solution to the earth as a fertilizer.

6. The method of claim 2, further comprising the step of separating crystalline material from the dissolution solution.

7. The method of claim 2, further comprising the step of applying the dissolution solution to the earth.

8. The method of claim 1, further comprising the step of reacting the dissolution solution with carbonic acid to form a solution having lower pH than the pH of the dissolution solution.

9. The method of claim 8, wherein the pH of the dissolution solution is between about 5 and about 11.

10. The method of claim 9, further comprising the step of contacting the pH-lowered dissolution solution with hydrogen peroxide.

11. The method of claim 9, further comprising the step of bringing the pH of the dissolution solution to about 7, and applying the resulting solution to the earth as a fertilizer.

12. The method of claim 1, further comprising the steps of placing said cadaver and the ethanolic potassium hydroxide solution in a vessel, and rocking the vessel to improve contact of the ethanolic potassium hydroxide solution with said cadaver.

13. The method of claim 12, further comprising the step of heating the vessel.

14. The method of claim 13, wherein said step of heating the vessel is achieved using at least one heater external to the vessel.

15. The method of claim 12, further comprising the step of sonicating the solution in the vessel to improve contact of the solution with said cadaver.

16. The method of claim 1, further comprising the step of contacting the dissolution solution with hydrogen peroxide.

17. The method of claim 1, further comprising the step of sonicating the solution to improve contact of the ethanolic potassium hydroxide solution with said cadaver.

18. The method of claim 1, wherein said step of determining when dissolution of said cadaver is completed is performed by visual observation.

19. The method of claim 1, further comprising the step of dissolving bones present in said cadaver by further reaction beyond when the dissolution of said cadaver is completed using said solution of having greater than or equal to 10% by weight of potassium hydroxide in ethanol or potassium hydroxide in an ethanol/water mixture.

20. A method for chemical dissolution of cadavers, comprising:
    preparing an ethanolic hydroxide solution having greater than or equal to 10% by weight of an alkali hydroxide in ethanol or in a mixture of alkali hydroxide, water, and ethanol;
    contacting the cadaver with the ethanolic hydroxide solution;
    heating the cadaver and the ethanolic hydroxide solution to a temperature above 155° F. and below 200° F. at atmospheric pressure; and
    determining when the dissolution of said cadaver is completed, whereby a dissolution solution having a pH is formed.

21. The method of claim 20, further comprising the step of reacting the dissolution solution with nitric acid or hydrochloric acid to form a solution having lower pH than the pH of the dissolution solution.

22. The method of claim 21, wherein the pH of the dissolution solution is between about 5 and about 11.

23. The method of claim 21, further comprising the step of disposing the dissolution solution in the ocean.

24. The method of claim 20, wherein the alkali hydroxide is selected from the group consisting of potassium hydroxide, sodium hydroxide, and a mixture of potassium hydroxide and sodium hydroxide.

25. The method of claim 24, wherein the alkali hydroxide comprises sodium hydroxide and the water comprises salt water or sea water.

* * * * *